United States Patent [19]
Breedlove

[11] Patent Number: 5,820,455
[45] Date of Patent: Oct. 13, 1998

[54] PORTABLE ANIMAL HOIST

[76] Inventor: William F. Breedlove, 34827 Meridian Rd., Lebanon, Oreg. 97355

[21] Appl. No.: 942,739

[22] Filed: Oct. 2, 1997

[51] Int. Cl.$^6$ ...................................................... A22B 1/00
[52] U.S. Cl. .......................... 452/187; 452/189; 452/192; 182/133
[58] Field of Search .................................. 452/187, 189, 452/192, 125; 182/133

[56] References Cited

U.S. PATENT DOCUMENTS

| | | | |
|---|---|---|---|
| 708,608 | 9/1902 | Zander | 452/192 |
| 2,842,300 | 7/1958 | Johnson | 182/133 |
| 3,854,168 | 12/1974 | Bradley | 452/189 |
| 3,894,313 | 7/1975 | Miller | 452/187 |
| 4,347,914 | 9/1982 | Gary | 182/142 |
| 4,394,013 | 7/1983 | Larsen | 273/1.5 |
| 4,432,306 | 2/1984 | Rossa | 119/100 |
| 4,506,411 | 3/1985 | Ivy | 452/187 |
| 4,806,063 | 2/1989 | York | 414/462 |
| 4,831,967 | 5/1989 | Anderson | 119/102 |
| 5,049,110 | 9/1991 | Owens | 452/189 |
| 5,236,386 | 8/1993 | Dingee | 452/192 |
| 5,305,710 | 4/1994 | Ward | 119/771 |
| 5,395,284 | 3/1995 | Frisk | 452/187 |
| 5,417,609 | 5/1995 | Oldham | 452/187 |
| 5,562,534 | 10/1996 | McGough | 452/187 |
| 5,591,077 | 1/1997 | Rowe | 452/189 |

*Primary Examiner*—Willis Little

[57] ABSTRACT

A portable animal hoist (10) comprises the vertical member (12). The member holder (12B) is securely attached to the top end of the vertical member (12) on one distal end. The opposite distal end of the member holder (12B) is wrapped around the tree (30) and securely fastened with the removable fastening device to the top of the vertical member (12) by the vertical member horizontal bracket (12A). The member holder (12B) functions to removably support the portable animal hoist (10) on the verticle member. A top cross member (14T) is securely attached perpendicularly to the top end of the vertical member (12). The bottom cross member (14B) securely attached at the bottom end of the vertical member (12) and positioned perpendicularly thereto. A horizontal member (16) is pivotally connected at the back distal end by the first fastener (28) to the top end of the vertical member (12) extending perpendicularly therefrom. A top pulley bracket (20) is securely fastened to the front distal end of the horizontal member (16). When the user pulls on the distal end of the rope (26), the lift member (24) is raised. When the user loosens the rope (26), the lift member (24) lowers.

10 Claims, 3 Drawing Sheets

PORTABLE ANIMAL HOIST

BACKGROUND OF THE INVENTION

1. Field of the Invention

The present invention relates to wild game hoists. More particularly, the present invention relates to wild game hoists which aid in the preparation of the game for travel including dressing and skinning.

2. Description of the Prior Art

Animal hoisting devices are widely used by hunters to hang the carcass of a slaughtered game animal wild it is being skinned and dressed. It is necessary after slaughter of an animal to remove the internal organs to prevent spoilage and the start of processes which cause the taste of the meat to change. Animals are often skinned and require support during this process. The attachment of the animal is often done by inserting a hook through an impaled portion of the animal. This, however, risks dropping the animal if the impaled portion breaks.

Generally, in game hoisting apparatuses a rigid cross member is provided with a central lifting ring. The cross member devices, at opposite ends, function to impale the carcass, or attach to an animal limb. The cross bean functions to spread the animal limbs making it easers to dress the animal. The cross member is supported from an overhead limb an may be lifted by a tackle attached to the limb. Tree limbs are often not very strong and further tend to sway during the skinning and dressing processes making it more difficult for the hunter.

Hunters' require a device which can be transported into the hunting area and conveniently set up. The device should be light weight and of sufficient strength to support any game which the hunter finds. Further, the device should have a secure attachment device to the animal to prevent a sudden dropping of the animal which can injure a hunter. The device needs to disassemble into a compact size which can be back packed easily.

Numerous innovations for a portable animal hoist have been provided in the prior art that are described as follows. Even though these innovations may be suitable for the specific individual purposes to which they address, they differ from the present invention as hereinafter contrasted.

In U.S. Pat. No. 5,591,077, titled Gambrel Support Structure for Animal Carcass, invented by Jerry D. Rowe a gambrel apparatus is provided for the support of animals and the like. The gambrel apparatus includes a spreader bar adapted to permit convenient and rapid adjustment of its length. End pieces of the spreader bar include special entailing hooks for mounting the animal thereon. Each hook is also connected to a common central connector which, in turn, is connected to a hoist unit. The hoist unit permits a single individual to raise and lower the animal with respect to the ground or other supporting area.

The patented invention differs from the present invention because the patented invention is a gambrel apparatus which supports an animal. A gambrel device is a stick or iron for suspending slaughtered animals. The patented invention is limited to the gambrel portion and does not include a tree mount device or boom. The present invention is a boom assembly which is mounted on a tree. A horizontal boom is supported by a cross brace device. A tackle is attached to the outer end of the boom. The invention further has a spreader bar assembly which is attached to the lower end of the tackle approximately in the middle. The spreader bar includes a tackle mount and cleat which are positioned in the middle of the spreader bar. The spreader bar has animal attachment loops on both ends which are cleated off to the central cleat. A meat hook rack is attached along the lower side of the spreader bar assembly.

In U.S. Pat. No. 5,588,907, titled Portable Game Hoist, invented by Richard DePietro a portable game hoist for hanging game or other objects from an existing support structure is disclosed. The inventive device includes a main beam which can be rested upon or secured relative to a support structure such as spaced rafters or a vertical support. A winch is secured relative to a first end of the main beam and stores a cable which is directed through the main beam to a second end thereof. The cable extends over a pulley at the second end of the main beam and couples with a hanger so as to permit hanging of game animals or the like relative to the support structure.

The patented invention differs from the present invention because the patented invention is a portable game hoist for hanging game. The patented invention is a vertical support having teeth on the inner side to grasp the tree trunk, It is held to the tree by straps which encompass the trunk. A horizontal bar is attached to the upper end of the vertical support. A winch is used to hoist the game and is attached to the vertical support. A line is lead from the winch through a first pulley on the inner end of the horizontal bar a second pulley on the outer end directs the line downwardly. A hook is attached to the end of the line. The patented invention lacks a tackle and the upper and lower mounting brackets. The present invention has the advantage of being more resistant to side loads on the end of the horizontal bar. The tackle arrangement of the present invention is simpler and probably lighter as well as less bulky.

In U.S. Pat. No. 5,562,534, titled Game Hoist and Skinning Aid, invented by Alvin H. McGough a portable game hoist and skinning aid is described which includes a support frame for supporting a deer carcass in a hoisted position off the ground and which may be attached to a tree, post or other vertical object by straps, chains or other means. The device includes a hand operated winch having a cable which may be passed over an upper pulley attached to the support frame to raise the deer carcass into position. The cable may also be run through a lower pulley and then attached to the skin of the animal so that operation of the winch provides assistance in skinning the suspended animal carcass.

The patented invention differs from the present invention because the patented invention is a portable game hoist for hanging game. The patented invention is a vertical support held to the tree by straps which encompass the trunk. A horizontal bar is attached to the upper end of the vertical support. A winch is used to hoist the game and is attached to second horizontal support located at the bottom of the vertical support. A line is lead from the winch through a first pulley on the outer end of the horizontal bar functioning to direct the line downwardly. The patented invention lacks a tackle and the upper and lower mounting brackets. The present invention has the advantage of being more resistant to side loads on the end of the horizontal bar. The tackle arrangement of the present invention is simpler and probably lighter as well as less bulky. The patented invention has provision for the winch to be used to assist in skinning the animal by attaching the line to the skin.

In U.S. Pat. No. 5,417,609, Titled Portable Wild Game Hanging Device, invented by Gregory E. Oldham a portable wild game hanging device is provided. The device has a J-shaped hook with transversely oriented base and arm portions. The hook may be secured about an elevated support, such as an elevated tree limb with the arm portion located over the elevated support. A pulley mechanism is supported under the arm portion of the hook on a rod which is coupled to the base portion of the hook. The pulley mechanism may be used to hoist and support a wild game animal. A pole is removably located in the hook in a pole receptacle which is coupled to the base portion of the hook. The pole may be used to lift the hook, rod, and pulley mechanism to an elevated support. The pole is formed of interlocking telescoping sections so the pole may be extended to lift the hook over an elevated support, and may be compressed for easy transport.

The patented invention differs from the present invention because the patented invention is a J-shaped hook secured about an elevated support, such as an elevated tree limb. The patented invention lacks features similar to the present invention.

In U.S. Pat. No. 5,395,284, titled Big Game Hoist, invented by Mark D. Frisk a big game hoisting tool is described comprising a handle supporting a winch which acts on a line running over a pulley at the end of a telescoping adjustable handle that can be hooked over a tree limb or any overhead structure making it a completely portable device.

The patented invention differs from the present invention because the patented invention is a big game hoisting tool which comprises a handle attached to a J-shaped hook which is secured about an elevated support, such as an elevated tree limb. The handle supports a winch which acts on a line running over a pulley at the end of a telescoping adjustable handle that can be hooked over a tree limb or any overhead structure making it a completely portable device. The patented invention lacks features similar to the present invention because it does not attach the tree trunk.

In U.S. Pat. No. 5,305,710, titled Pet Carrier Mountable on Bicycles and the like, James F. Ward, Jr. a carrier with a harness and a platform having a plurality of releasable fasteners is described. The harness includes at least three sets of straps extendable around a dog's torso, with one of these strap sets being disposed proximate with the dog's neck and another with its hindquarters. Each releasable fastener is attachable to one of the strap sets proximate with the dog's underside and is anchored to one of a plurality of connectors which are spaced apart from each other and slidably tethered to the platform. Mountable on a bicycle, the platform is rigidly secured to, and supported in part by, the bicycle handlebars or, alternately, the bicycle seat post. The platform is further supported by at least one pair of frame members rigidly affixed thereto. The frame members of each such pair extend downwardly, straddling one of the spoked wheels of the bicycle, and are releasably secured to the bicycle frame proximate with the hub of the wheel they straddle. A leash connected to each of the strap sets of the harness allows a bicyclist to hoist an animal singlehandedly onto the platform while simultaneously stabilizing his bicycle. Perched on the platform and secured thereto by the harness, a pet can recline on the platform in a wide variety of orientations. Coupling between the harness and the platform is at once sufficiently restraining to prevent the pet's twisting into a position in which the pet is hanging by the harness from the platform and sufficiently flexible to allow the pet to shift its own body weight while the bicycle is in motion.

The patented invention differs from the present invention because the patented invention is a carrier with a harness and a platform which is securely attached to a bicycle and functions to secure a pet thereto. The patented invention lacks features similar to the present invention.

In U.S. Pat. No. 5,236,386, titled Portable Deer Hoist and Support, invented by David Dingee a device for field dressing of game is set forth. It includes an upstanding central strap which connects at its lower end to a pivot means. The pivot means supports a left arm, and a duplicate right arm. They engage the hind legs of game for cleaning. In addition to the left and right arms, replicated components function as left arm and right arm braces connecting with said strap to define a rigid structure. On subsequent deployment of the braces, a pair of snips or a measuring device can be assembled. In the folded condition, the strap defines a collinear arrangement of the various arms.

The patented invention differs from the present invention because the patented invention is use to skin and gut an animal. The patented invention lacks features similar to the present invention.

In U.S. Pat. No. 4,831,967, titled Animal Lift Frame, invented by Charles D. Anderson an animal lift frame provides a mechanically adjustable support structure for restraint and skeletal support of an animal undergoing veterinary care. The lift frame includes a generally rectangular frame portion with front and rear beam members connected by a center beam, and right and left side rail members. The center beam carries a slidable counter balance/lifting eye member attachable to a center chain for lifting of the entire apparatus by a common hoist means. A series of adjustable length stabilizer straps extend from a point on this center chain to a fixed or adjustable lifting eye on each of the front and rear beam and right and left rail members. A harness or sling for supporting the underside of the animal is removably secured to the right and left rails.

The patented invention differs from the present invention because the patented invention is an animal lift frame provides a mechanically adjustable support structure for restraint and skeletal support of an animal undergoing veterinary care. The patented invention functions with a hoist that is not part of the invention. Further, the patented invention is designed to support an animal upright without damage. The present invention functions to support an animal in the wilderness for gutting and skinning. The present invention supports the animal by the hind legs.

In U.S. Pat. No. 4,806,063, titled Portable Wild Game Hoist, invented by W. Clifton York a portable wild game hoist is described having a multiple section boom which can be assembled and dismantled. The boom is supported at its lower end by a standard trailer hitch mounted on the rear of a vehicle. Straps are secured to the upper section of the boom and terminate in hooks at their distal ends which are adapted to mate with the edges of the fenders of the vehicle. A torsion bar is adjustably secured to one section of the boom so that is bears against the rear body or tailgate of the vehicle. A rope extends from a winch secured to the boom through a pulley at the distal end of the boom. The rope supports a hanger with hooks for supporting the animal from its rear hooves. In a further embodiment, the boom may be supported by a base resting on the ground and stabilized by the trailer hitch. In both embodiments, the boom is comprised of a plurality of mating sections.

The patented invention differs from the present invention because the patented invention is a portable wild game hoist having a multiple section boom which is supported at its lower end by a standard trailer hitch mounted on the rear of a vehicle. Straps are secured to the upper section of the boom and terminate in hooks at their distal ends which are adapted to mate with the edges of the fenders of the vehicle. The present invention is a boom assembly which has upper and lower tree mounting brackets. The lower bracket has teeth to engage the a tree trunk. Straps which are wrapped around the tree attach to opposite ends of each of the tree mounting brackets. The lower tree mounting bracket has teeth which function to grab the tree trunk and prevent the whole assembly from slipping down under load and while being installed. A horizontal boom is supported by a cross brace device. A tackle is attached to the outer end of the boom. The invention further has a spreader bar assembly which is attached to the lower end of the tackle approximately in the middle. The spreader bar includes a tackle mount and cleat which are positioned in the middle of the spreader bar. The spreader bar has animal attachment loops on both ends which are cleated off to the central cleat. A meat hook rack is attached along the lower side of the spreader bar assembly, functioning to accept meat hook for hanging game and butchered parts of game.

In U.S. Pat. No. 4,432,306, titled Portable Humane Cow Lift, invented by Dennis J. Rossa an apparatus for lifting a down cow or other like animal is described. This invention comprises a frame having four vertical legs connected by an array of cross members. The legs and cross members include tubing of similar shape, but of different cross-sectional dimension so that elements of the frame may be hand-carried to a down animal and easily assembled in sliding fit engagement without tools. Two winches each connected to one end of a sling and to the frame are provided to lift the front portion of the animal. A hip clamp adjusted to engage the animal's pelvic bones and a hoist connected to a cross member lift the animal's hind quarters.

The patented invention differs from the present invention because the patented invention is animal lift frame provides a mechanically adjustable support structure for restraint and skeletal support of an animal undergoing veterinary care. The patented invention functions with a hoist that is not part of the invention. Further, the patented invention is designed to support an animal upright with out damage. The present invention functions to support an animal in the wilderness for gutting and skinning. The present invention supports the animal by the hind legs.

In U.S. Pat. No. 4,394,013, titled Apparatus for Basketball, invented by James E. Larsen and Charles E Rogers an apparatus to accept, hold and release a basketball in game playing situations requiring a "jump ball" is described. The primary components of the apparatus are: a suspension frame; a telescoping elevator unit carried beneath the frame; a basketball accepting, holding and releasing mechanism carried coaxially within the elevator unit; a hoist mechanism for the elevator unit; and, an electrical system for actuating ball release and the hoist mechanism and for signaling the operative condition of the apparatus.

The patented invention differs from the present invention because the patented invention is an apparatus to accept, hold and release a basketball in game playing situations requiring a "jump ball" is described. The patented invention lacks features similar to the present invention.

In U.S. Pat. No. 4,347,914, titled Portable Tree Sling or Portable Tree Stand or Portable Tree Hunting Sling, or Alternatives, invented by David A Gary a lightweight portable "tree stand" or hunting sling is described which is utilized to hoist a hunter appreciably above ground level and support the hunter thereat, the "tree stand" including a seat rest and a back rest of fabric material the seat rest having a medial seat portion and opposite end portions to the latter of which are connected a foot rest in the form of a rope, means for adjustably connecting the seat portion of the seat rest to the back rest, the back rest having two upwardly directed spaced arms connected by ropes to a hoist while additional ropes connect the hoist to the arms of the seat rest, and another rope passing through openings of the back rest for manipulating the "tree stand" through 360 degrees.

The patented invention differs from the present invention because the patented invention is a lightweight portable "tree stand" or hunting sling is described which is utilized to hoist a hunter. The patented invention lacks features similar to the present invention.

Numerous innovations for portable animal hoist have been provided in the prior art that are adapted to be used. Even though these innovations may be suitable for the specific individual purposes to which they address, they would not be suitable for the purposes of the present invention as heretofore described.

SUMMARY OF THE INVENTION

The present invention is a boom assembly which has upper and lower tree mounting brackets. The lower bracket has teeth to engage the a tree trunk. Straps which are wrapped around the tree attach to opposite ends of each of the tree mounting brackets. The lower tree mounting bracket has teeth which function to grab the tree trunk and prevent the whole assembly from slipping down under load and while being installed. A horizontal boom is supported by a cross brace device. A tackle is attached to the outer end of the boom. The invention further has a spreader bar assembly which is attached to the lower end of the tackle approximately in the middle. The spreader bar includes a tackle mount and cleat which are positioned in the middle of the spreader bar. The spreader bar has animal attachment loops on both ends which are cleated off to the central cleat. A meat hook rack is attached along the lower side of the spreader bar assembly, functioning to accept meat hook for hanging game and butchered parts of game.

The types of problems encountered in the prior art are supporting of a game animal for skinning and dressing with a light weight backpackable support device.

In the prior art, unsuccessful attempts to solve this problem were attempted namely hoists and spreader bars which support an animal but lack a secure attachment to a tree. However, the problem was solved by the present invention because light weight tubing is used to reduce the weight and the parts fold into a compact unit for transportation. A integral hoist is provided which attaches to a boom which is supported by upper and lower tree mounting brackets.

Accordingly, it is an object of the present invention to provide a portable animal hoist which is light weight, compactable, includes a hoist and tree support.

More particularly, it is an object of the present invention to provide a secure support of an animal from a tree.

In keeping with these objects, and with others which will become apparent hereinafter, one feature of the present invention resides, briefly stated, in vertical member with a top cross member and bottom cross member which provide stability.

In accordance with another feature of the present invention, teeth on the bottom cross member securely grip the tree and function to prevent the present invention from slipping down the tree.

Another feature of the present invention is that a single chain attached to the top of the verticle member and passed around the tree, supports the present invention.

Yet another feature of the present invention is that single chain is adjustable.

Still another feature of the present invention is that a horizontal member at an inner end is attached to the top of the verticle member ans is supported by at least one support.

Yet still another feature of the present invention is that a horizontal member is attached at an outer end to a upper end of a tackle comprising a top pulley bracket having a top pully. A bottom pully bracket having a bottom pully are operably connected by a rope.

Still yet another feature of the present invention is that the bottom pully bracket is an intergral part of a lift member which functions to support an animal for dressing and skinning.

Another feature of the present invention is that the lift member ends have a lift member left guide and a lift member right guide through which a support device is guided. The support device loops around an animal part, such as a limb which is a more secure attachment than a hook passing through a tendon of the animal.

Yet another feature of the present invention is that a pully assemble is an integral part of the lift member.

Still another feature of the present invention is that lift member includes a cleat for attaching a support device.

Yet still another feature of the present invention is that a lift member plate is securely attached to a bottom of the lift member. The lift member plate includes a series of lift member plate openings for securing meat hooks.

Still yet another feature of the present invention is that the tackle parts may be added and removed to adapt to the strength of the hunter and the weight of the animal.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

10—portable animal hoist (10)
12—vertical member (12)
12A—vertical member horizontal bracket (12A)
12B—vertical member holder (12B)
14T—top cross member (14T)
14B—bottom cross member (14B)
14BL—bottom cross member left side (14BL)
14BR—bottom cross member right side (14BR)
14BM—bottom cross member middle (14BM)
14BA—bottom cross member teeth (14BA)
16—horizontal member (16)
18L—left support (18L)
18R—right support (18R)
20—top pulley bracket (20)
20A—top pulley (20A)
22—bottom pulley bracket (22)
22A—bottom pulley (22A)
24—lift member (24)
24A—lift member plate (24A)
24AA—lift member plate opening (24AA)
24BL—lift member left guide (24BL)
24BR—lift member right guide (24BR)
24C—lift member eye (24C)
26—rope (26)
28—fastener (28)
30—tree (30)
32—animal (32)

DESCRIPTION OF THE PREFERRED EMBODIMENT

Figure 1:
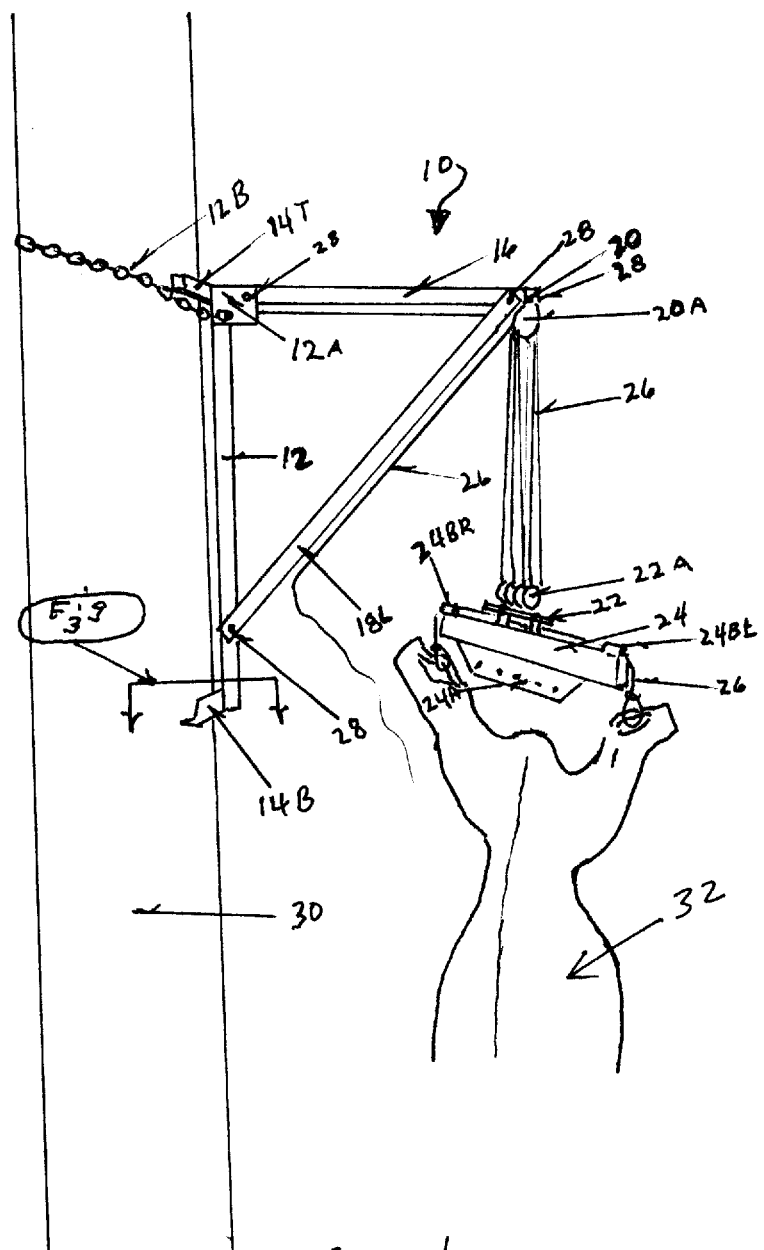
FIG. 1 is a side view of a portable animal hoist (10) mounted to a tree (30) with an animal (32) hanging therefrom.

Firstly, referring to FIG. 1 which is a side view of a portable animal hoist (10) mounted to a tree (30) with an animal (32) hanging therefrom. The portable animal hoist (10) comprises a vertical member (12). A member holder (12B) is securely attached to a top end of the vertical member (12) on one distal end. The opposite distal end of the member holder (12B) is wrapped around a tree (30) and securely fastened with a removable fastening device to the top of the vertical member (12) by a vertical member horizontal bracket (12A). The member holder (12B) functions to removably support the portable animal hoist (10) on a verticle member. The member holder (12B) is selected from a group consisting of chain, rope, leather strapping, cloth strapping, plastic strapping and plastic composite strapping.

A top cross member (14T) is securely attached perpendicularly to a top end of the vertical member (12). A bottom cross member (14B) securely attached at a bottom end of the vertical member (12) and positioned perpendicularly thereto. The bottom cross member (14B) and the top cross member (14T) function to stabilize the portable animal hoist (10).

A horizontal member (16) is pivotally connected at a back distal end by a first fastener (28) to the top end of the vertical member (12) extending perpendicularly therefrom. A at least one support (18L) is pivotally connected at a bottom end of the vertical member (12) by a second fastener (28). A top distal end of the at least one support (18L) is securely attached to a front end of the horizontal member (16) by a third fastener (28). The at least one support (18L) functions to support the horizontal member (16) in a substantially horizontal position.

A top pulley bracket (20) is securely fastened to a front distal end of the horizontal member (16). The top pulley bracket (20) comprises a top pulley (20A) which is rotatably mounted therein. A bottom pulley bracket (22) is securely connected at a middle position of a lift member (24). The bottom pulley bracket (22) comprises a bottom pulley (22A) which is rotatably mounted therein. A rope (26) movably connects the top pulley (20A) to the bottom pulley (22A). When a user pulls on a distal end of the rope (26), the lift member (24) is raised. When the user loosens the rope (26), the lift member (24) lowers.

The lift member (24) comprises a lift member plate (24A) which is longitudinally disposed thereon and securely attached at a bottom surface thereof.

The portable animal hoist (10) is manufactured from a material selected from a group consisting of metal, metal alloy, carbon-graphite, fiberglass, epoxy, wood, wood composite, plastic, and plastic composite.

Figure 2:
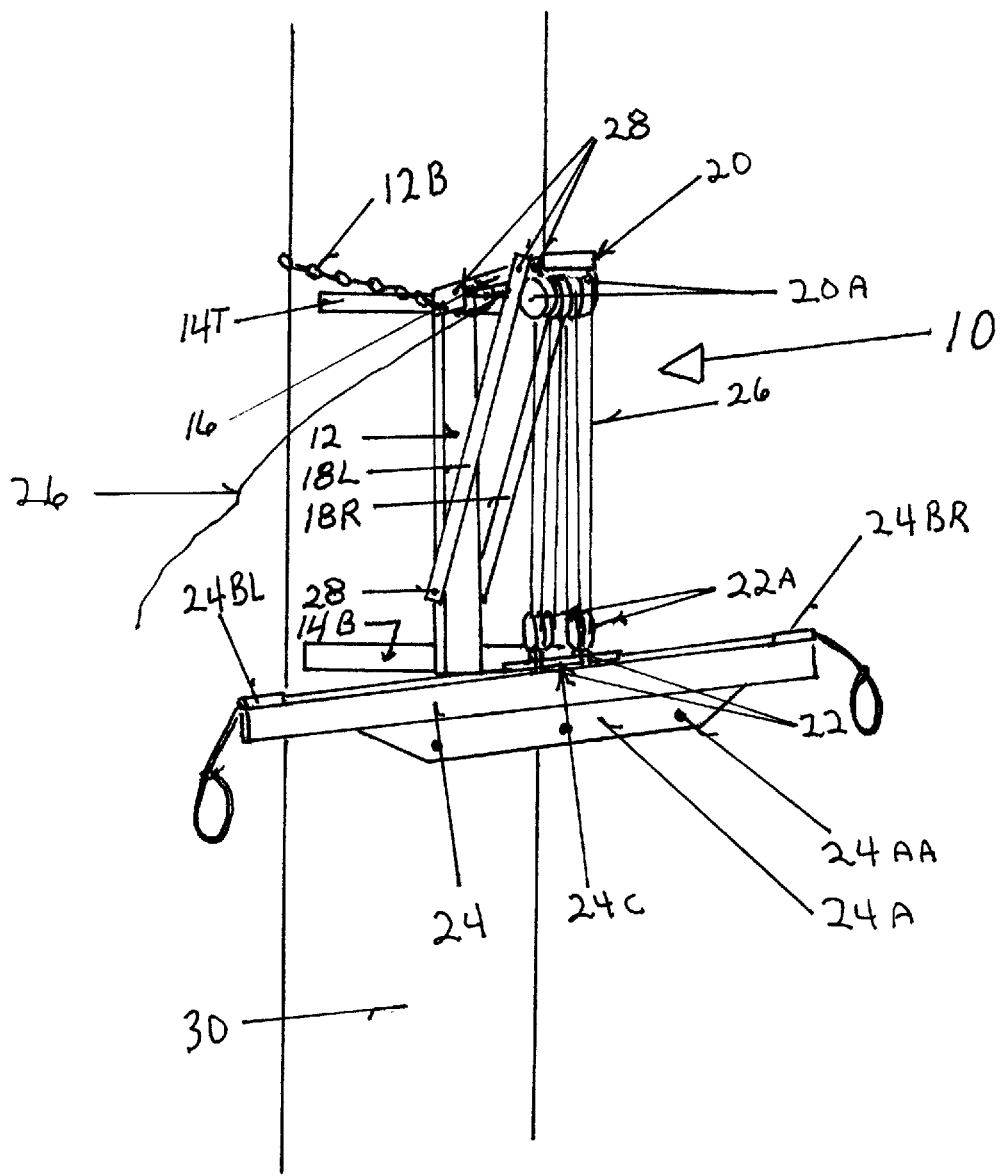
FIG. 2 is a front view of a portable animal hoist (10) mounted to a tree (30).

Secondly, referring to FIG. 2 which is a front view of a portable animal hoist (10) mounted to a tree (30). The portable animal hoist (10) comprises the vertical member (12). The member holder (12B) is securely attached to the top end of the vertical member (12) on one distal end. The opposite distal end of the member holder (12B) is wrapped around the tree (30) and securely fastened with the removable fastening device to the top of the vertical member (12) by the vertical member horizontal bracket (12A). The member holder (12B) functions to removably support the portable animal hoist (10) on the verticle member.

A top cross member (14T) is securely attached perpendicularly to the top end of the vertical member (12). The bottom cross member (14B) securely attached at the bottom end of the vertical member (12) and positioned perpendicularly thereto. The bottom cross member (14B) and the top cross member (14T) function to stabilize the portable animal hoist (10).

The at least one support (18L, 18R) is pivotally connected at the bottom end of the vertical member (12). The top distal end of the at least one support (18L, 18R) is securely attached to the front end of the horizontal member (16). The at least one support (18L, 18R) function to support the horizontal member (16) in a substantially horizontal position.

A top pulley bracket (20) is securely fastened to the front distal end of the horizontal member (16). The top pulley bracket (20) comprises the top pulley (20A) which is rotatably mounted therein. The bottom pulley bracket (22) is securely connected at the middle position of the lift member (24). The bottom pulley bracket (22) comprises the bottom pulley (22A) which is rotatably mounted therein. The rope (26) movably connects the top pulley (20A) to the bottom pulley (22A). When the user pulls on the distal end of the rope (26), the lift member (24) is raised. When the user loosens the rope (26), the lift member (24) lowers.

The lift member (24) comprises the lift member plate (24A) which is longitudinally disposed thereon and securely attached at the bottom surface thereof. The lift member plate (24A) comprises the plurality of lift member plate openings (24AA) disposed therein. The lift member (24) further, comprises the lift member left guide (24BL) securely attached to the top surface thereof, the lift member left guide (24BL) functions to guide the rope (26) preventing entanglement. The lift member (24) still further comprises the lift member right guide (24BR) securely attached to the top surface thereof, the lift member right guide (24BR) functions to guide the rope (26) preventing entanglement. The lift member (24) further comprises the lift member eye (24C) securely attached to the middle of the top surface thereof, the lift member eye (24C) functions to pre-guide the rope (26) into the lift member left guide (24BL) and lift member right guide (24BR) preventing entanglement.

Figure 3:
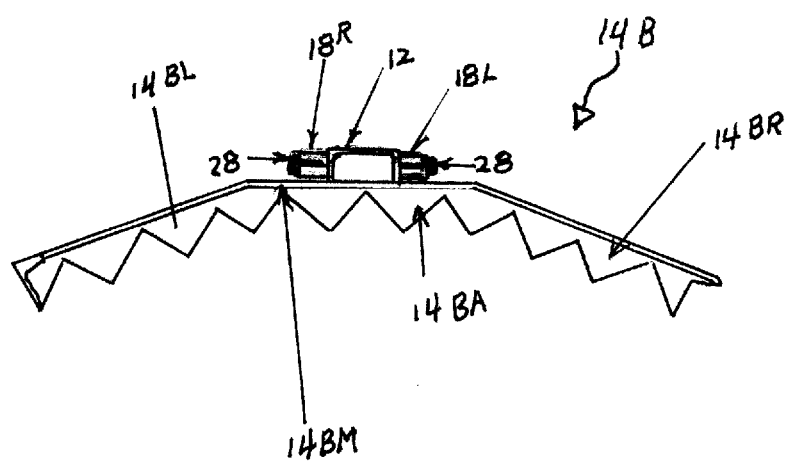
FIG. 3 is a top view of a bottom cross member (14B).

Lastly, referring to FIG. 3 which is a top view of the bottom cross member (14B). The bottom cross member (14B) securely attached at the bottom end of the vertical member (12) and positioned perpendicularly thereto. The bottom cross member (14B) comprises the bottom cross member left side (14BL) which is securely connected at an obtuse angle to the bottom cross member middle (14BM). The bottom cross member middle (14BM) is securely connected at an obtuse angle to the bottom cross member right side (14BR). The bottom cross member (14B) further comprises a plurality of bottom cross member teeth (14BA) extending inwardly therefrom. The bottom cross member (14B) and the top cross member (14T) function to stabilize the portable animal hoist (10).

It will be understood that each of the elements described above, or two or more together, may also find a useful application in other types of constructions differing from the type described above.

While the invention has been illustrated and described as embodied in a portable animal hoist, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A portable animal hoist (10) comprising:
   A) a vertical member (12);
   B) a vertical member holder (12B) securely attached to a top end of the vertical member (12) and positioned around a tree (30);
   C) a top cross member (14T) securely attached to a top end of the vertical member (12) and positioned perpendicularly thereto;
   D) a bottom cross member (14B) securely attached to a bottom end of the vertical member (12) and positioned perpendicularly thereto;
   E) a horizontal member (16) pivotally connected at a back distal end by a first fastener (28) to the top end of the vertical member (12) extending perpendicularly therefrom;
   F) at least one support pivotally connected at a bottom distal end, by a second fastener (28), to the bottom end of the vertical member (12) and pivotally connected at a top distal end, by a third fastener (28), to a front end front end of the horizontal member (16);
   G) a top pulley bracket (20) securely fastened to a front distal end of the horizontal member (16), the top pulley bracket (20) comprises a top pulley (20A) rotatably mounted therein;
   H) a bottom pulley bracket (22) is securely connected at a middle position of a lift member (24), the bottom pulley bracket (22) comprises a bottom pulley (22A) rotatably mounted therein; and
   I) a rope (26) movably connects the top pulley (20A) to the bottom pulley (22A), when a user pulls on a distal end of the rope (26), the lift member (24) is raised, when the user loosens the rope (26), the lift member (24) lowers.

2. The portable animal hoist (10) as described in claim 1, wherein the vertical member (12) comprises a vertical member horizontal bracket (12A) securely fastened at the top distal end thereon, the vertical member (12) is pivotally connected to the back distal end of the horizontal member (16) by the first fastener (28).

3. The portable animal hoist (10) as described in claim 1, wherein the bottom cross member (14B) comprises a bottom cross member left side (14BL) securely connected at an obtuse angle to a bottom cross member middle (14BM) which is securely connected at an obtuse angle to a bottom cross member right side (14BR).

4. The portable animal hoist (10) as described in claim 1, wherein the bottom cross member (14B) comprises a plurality of bottom cross member teeth (14BA) extending inwardly therefrom.

5. The portable animal hoist (10) as described in claim 1, wherein the support comprises a left support (18L) connected at a bottom distal end, by the second fastener (28), to the bottom end of the vertical member (12) and pivotally connected at a top distal end, by a third fastener (28), to the front end of the horizontal member (16), the support further comprises a right support (18L) connected at a bottom distal end, by the second fastener (28), to the bottom end of the vertical member (12) and pivotally connected at a top distal end, by a third fastener (28), to the front end of the horizontal member (16).

6. The portable animal hoist (10) as described in claim 1, wherein the lift member (24) comprises a lift member plate (24A) is longitudinally disposed thereon and securely attached at a bottom surface thereof, the lift member plate (24A) comprises a plurality of lift member plate openings (24AA) disposed therein.

7. The portable animal hoist (10) as described in claim 1, wherein the lift member (24) comprises a lift member left guide (24BL) securely attached to a top surface thereof, the lift member left guide (24BL) functions to guide the rope (26) preventing entanglement.

8. The portable animal hoist (10) as described in claim 1, wherein the lift member (24) further comprises a lift member right guide (24BR) securely attached to a top surface thereof, the lift member right guide (24BR) functions to guide the rope (26) preventing entanglement.

9. The portable animal hoist (10) as described in claim 8, wherein the lift member (24) further comprises a lift member eye (24C) securely attached to a middle of the top surface thereof, the lift member eye (24C) functions to pre-guide the rope (26) into the lift member left guide (24BL) and lift member right guide (24BR) preventing entanglement.

10. The portable animal hoist (10) as described in claim 1 is manufactured from a material selected from a group consisting of metal, metal alloy, carbon-graphite, fiberglass, epoxy, wood, wood composite, plastic, and plastic composite.

* * * * *